United States Patent [19]
Warner

[11] 4,033,145
[45] July 5, 1977

[54] CONSTANT ANGULAR VELOCITY JOINT

[75] Inventor: John C. Warner, Ithaca, N.Y.

[73] Assignee: Borg-Warner Corporation, Chicago, Ill.

[22] Filed: Dec. 5, 1975

[21] Appl. No.: 637,901

[52] U.S. Cl. .................................. 64/21; 64/7; 64/8

[51] Int. Cl.² ..................................... F16D 3/30

[58] Field of Search .................... 64/21, 8, 7, 9

[56] References Cited

UNITED STATES PATENTS

| | | | |
|---|---|---|---|
| 3,125,870 | 3/1964 | Orain | 64/8 |
| 3,392,548 | 7/1968 | Meyer | 64/21 |
| 3,792,598 | 2/1974 | Orain | 64/21 |
| 3,942,335 | 3/1976 | Orain | 64/21 |

*Primary Examiner*—Samuel Scott
*Assistant Examiner*—Randall Heald
*Attorney, Agent, or Firm*—Aubrey L. Burgess

[57] ABSTRACT

A constant angular velocity joint for the transmission of rotational movements between two shafts includes a pair of driving members, each coupled to a shaft, one driving member having a plurality of generally equally spaced pivot means connected obliquely thereto so as to overlie the driving member, the other driving member being generally cylindrical and having a converging portion extending therefrom with a plurality of open ended, generally radial spaced slots therein, the spacing of which corresponds to the spacing of the pivot means. Each pivot means is received in one of said slots for relative movement with respect thereto depending on the angular position of said driving means.

23 Claims, 9 Drawing Figures

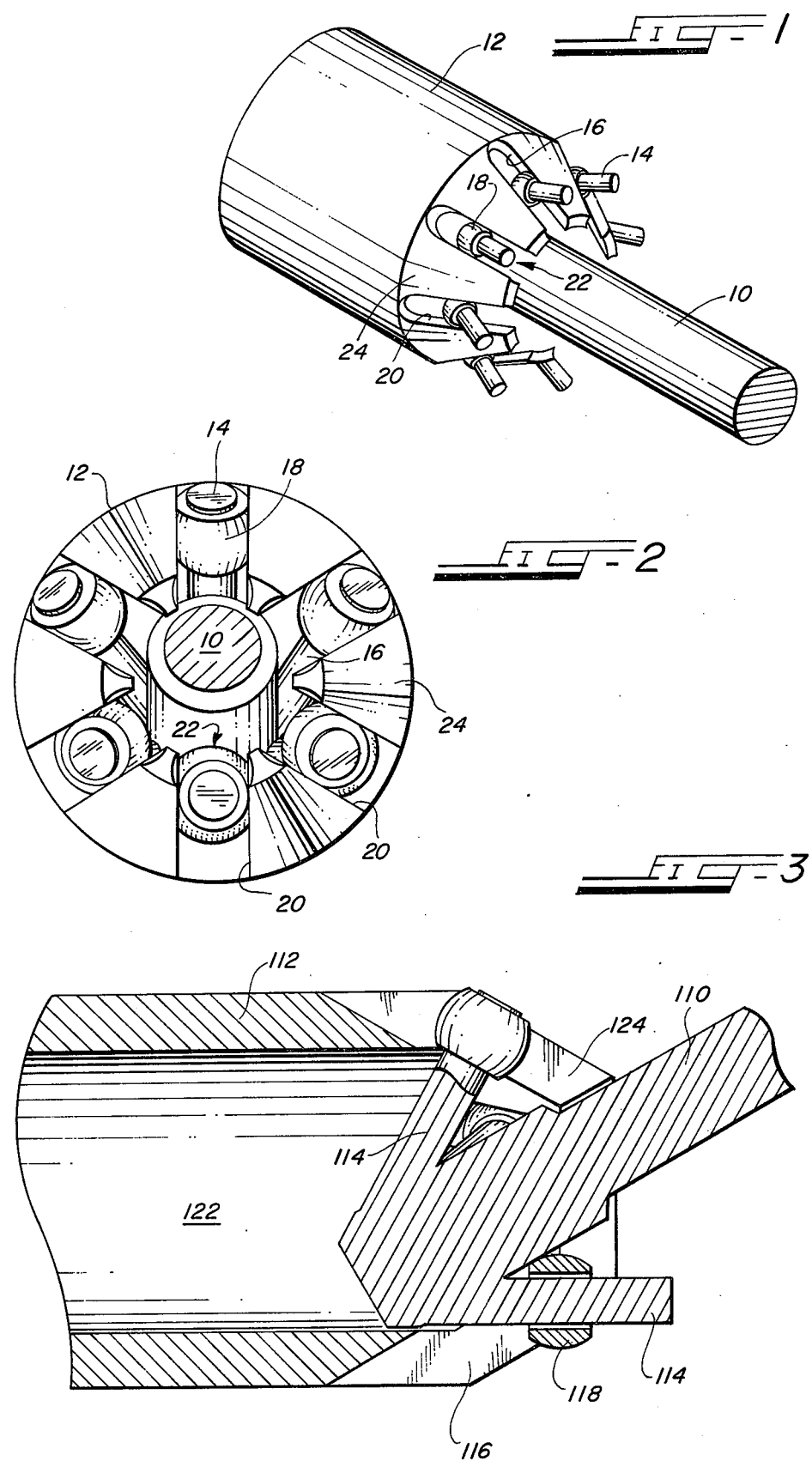

CONSTANT ANGULAR VELOCITY JOINT

BACKGROUND OF THE INVENTION

Universal joints for transmitting rotational movement are well known in the art. Examples of such joints are found in the U.S. Pat. No. 3,125,870, issued Mar. 24, 1964 to Orain. In the joints shown and described in this patent, one driving member is provided with a plurality of spaced pivot means which are normally or obliquely oriented with respect to the driving member and which extend forward of the driving member to which they are connected. The other driving member has a generally diverging portion with a plurality of equally spaced slots, each to receive a pivot means. The pivot means is capable of relative movement with respect to its slots, permitting the shafts to be angularly oriented to one another yet coupled for transmitting rotation therebetween. The pivot means may each be provided with a spherical member which is capable of sliding therealong or to rotate thereabout; the spherical member contacting the walls of its respective slot.

THE INVENTION

According to this invention, a constant angular velocity joint comprises a pair of driving members, one having a plurality of obliquely extending pivot means connected thereto and positioned to extend and overlie the driving member. The other driving member or the joint portion thereof comprises a generally cylindrical member having a cavity and converging slotted portion. The slots are spaced corresponding in spacing to the pivot means of the first driving member, and each receives a pivot means for relative movement. A portion of the first driving means is received in the cavity; the pivotable center of the joint is within the cavity making the joint very compact yet capable of permitting a high degree of angularity between the shafts. By using a backing arrangement, if desired, the axial movement of the first driving member relative to the second driving member can be limited; further, the backing arrangement may be capable of carrying axial thrust leads from the first to the second driving members. Spherical members may be mounted on the pivot means to engage the wall of the respective slot for rotation and sliding movements relative thereto.

In some embodiments of the invention, the obliquely extending pivot means are cantilevered; in other embodiments to permit higher torque loading, a double support for the pivot means is used.

THE DRAWINGS

FIG. 1 is a perspective view of a typical universal joint made accordingly to this invention;

FIG. 2 is an end view of one embodiment of this invention;

FIG. 3 is a partial sectional view taken on line 3—3 of FIG. 2;

DETAILED DESCRIPTION

Figure 3A:
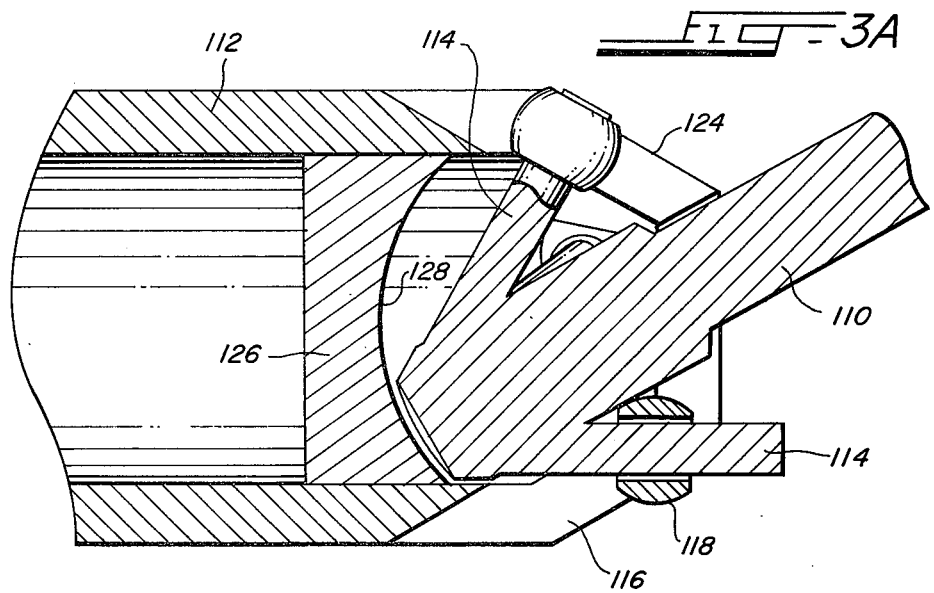
FIG. 3A is a view similar to FIG. 3 additionally showing the use of a backing member to carry axial thrust loads.

A universal joint constructed according to this invention and constituting one general form is illustrated in FIG. 1. The joint comprises, essentially, a first driving member 10 and a second driving member 12, each of which is adapted to be connected to, coupled to, or fabricated from one of a pair of shafts (not illustrated) or other driving or driven members. In other words, the driving members are rigidly associated with their respective shaft. The driving members 10 and 12 are rotatably coupled by pivot members 14 fixed to the first driving member 10 which extends through slots 16 in the second driving member 12. For purposes of permitting the angularity between the driving member 10 and 12, there are provided one or more pivot members 14; while any number of pivot members is possible, with three or more, self-centering is assured. FIG. 1 illustrates a joint with eight pivot members. Thus there are open-ended slots 16 equal in number to the pivot members. In any event, the pivot members and thus the slots generally are equally spaced from each other. Each pivot member may, as illustrated in FIG. 1 be provided with one or more generally spherical intermediate member 18 suitably drilled for sliding movement around or along the length of the pivot member; (here, there is one member 18 per pivot member) also, each slot 16 may, if desired, be formed with arcuate side walls 20, 20 to be rotatably engaged by the intermediate member 18.

The second driving member 12 in the FIG. 1 embodiment is generally cylindrical in shape (in other embodiments it may be spherical, ovoid or of other shape) and has a cavity 22 into which the first driving member 10 is received. The driving member 12 has a terminal end 24 which converges toward the first driven member 10; the slots 16 are primarily formed in the terminal end 24.

The pivot members 14 radiate from the driven member 10 obliquely and such to overlie the member 10; in other words they extend from their roots generally in the same direction as the member 10 to which they are connected. The pivot center for the joint lies on the juncture of the longitudinal axis of the driven members which is located within the cavity 22.

In the FIG. 1 form, the terminal end 24 is generally conical in shape; other surfaces of revolution (about the shaft axis) may be used, as will be described with reference to another embodiment of the invention.

Figure 4:
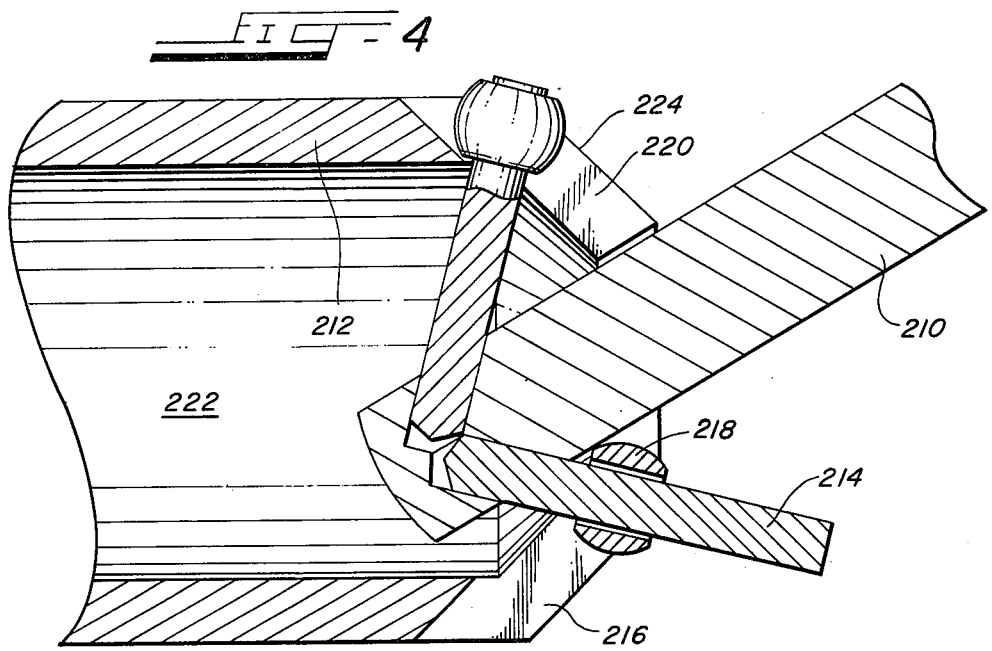
FIG. 4 is a partial sectional view, similar to FIG. 3 illustrating a second embodiment of the invention.

The embodiments illustrated in FIGS. 2 and 3 and FIG. 4 are similar to the joint illustrated in FIG. 1; they differ in minor ways, i.e., the particular shape of the first driving member, the oblique angle of the pivot members relative to the first driving member, and the angularity of the conical terminal end of the second driving member. For purposes of this description, the parts of FIGS. 2 and 3 will be identified by reference characters similar to those used for FIG. 1 with the addition of 100; the parts of FIG. 4 will be likewise identified with the addition of 200.

Thus in FIGS. 2 and 3, which illustrates a joint having six pivot means 114 and six slots 116, the first and second driving members are identified as 110 and 112, respectively; the side walls of each slot 116 are identified as 120, the intermediate members 118 are such to slide on the pivot means 114 and to rotate relative to the slots 116. In this embodiment, the longitudinal axes of the pivot means each defines an angle of about 30° with the longitudinal axis of the first driving member 110, and a line along the length of the conical end portion 124 of the second driving member 112 defines an angle of 30° with an intersecting line along the length of the cylindrical portion of the member 112. As illustrated in FIG. 3, the terminus of the portion 124 and also the terminus of the member 110 can function as stop or a motion limiting means to limit the maximum angular relationship attainable between the driving members 110 and 112. Also, it should be understood that such relationship between the driving members is not limited to any one plane.

In FIG. 3A, an additional element is provided in the combination which is identified by the reference character 126. It comprises a backing member fixed in the driving member 112 and having a concave spherical surface 128 against which the terminal end of the driving member 110 abuts. This member 126 centers and locates the pivot point of the driving member 110 and also carries any axial thrust of the driving member 110.

In FIG. 4, these is illustrated first and second driving members 210, and 212, a plurality of pivot members 214 and a like number of slots 216. The side walls of each slot are identified as 200 while the intermediate members are referred as 218. The cavity in the second driving member in which the driving member 210 is received is identified as 222 and the conical end of 212 is identified as 224. The principal differences between FIG. 4 and FIG. 3, other than a particular shape of the member 210, is the angular disposition of the pivot members 214 to the driving member 210 and the slope of the part 224. Here, the angle is 45°. The terminus of the portion 224 cooperates with the member 210 to function as a motion limiting means.

A backing member similar to the backing member 126 in the FIG. 3A embodiment may be used in the FIG. 4 embodiment if necessary or desirable.

The angular disposition of the pivot means and the second driving means to certain reference elements is merely illustrative. Any angle may be used, so long as substantially the same angle is used on both means; some angles produce a more compact joint than others.

Figure 5A:
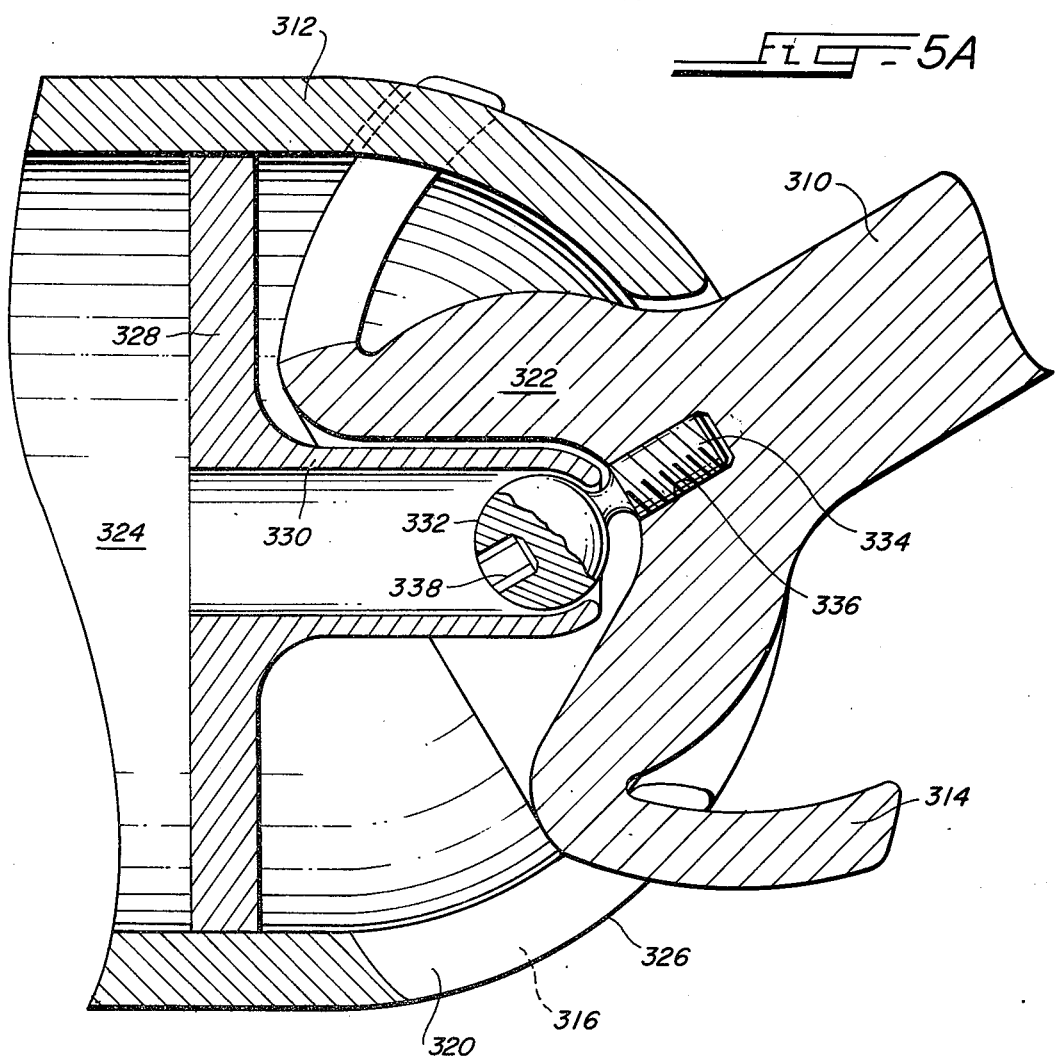
FIG 5A and 5B are views similar to FIG. 5 additionally showing alternative structure to carry axial thrust loads.
Figure 5:
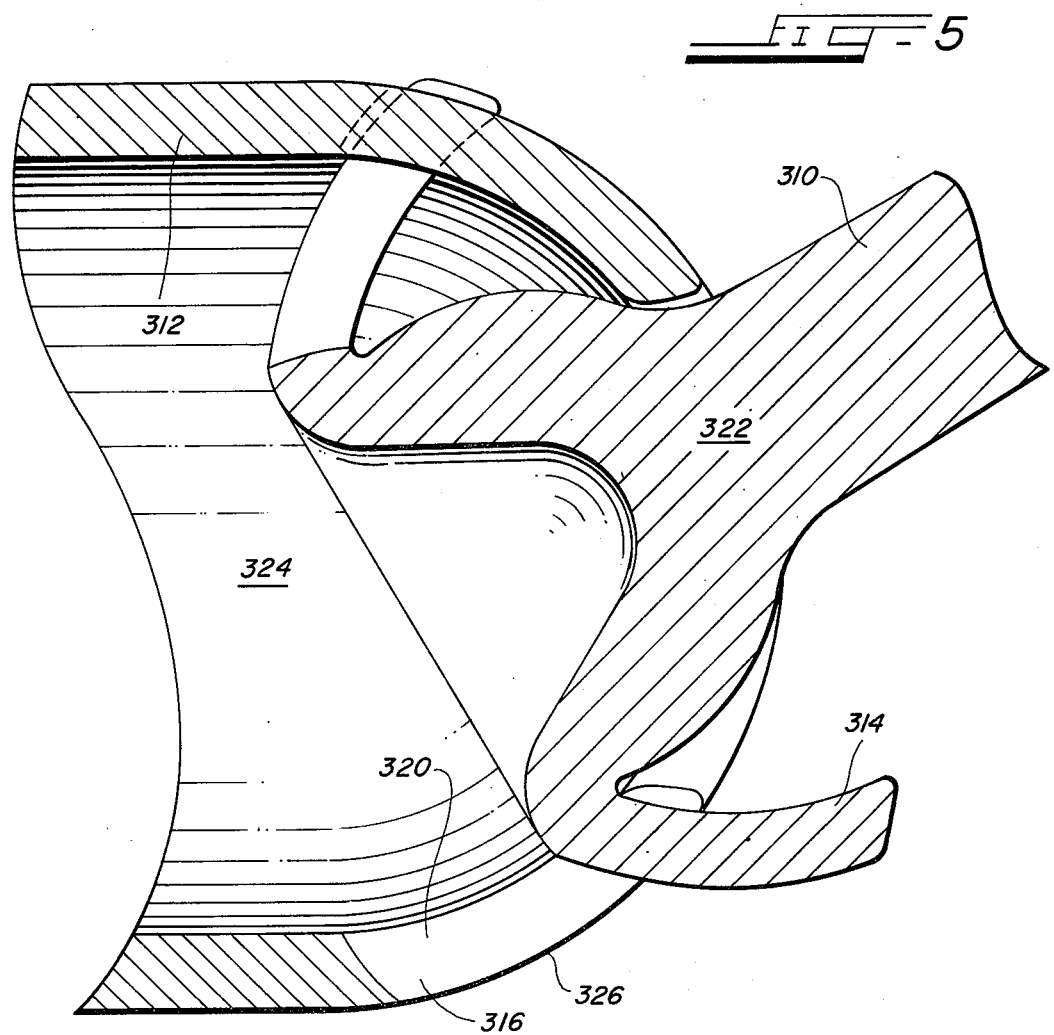
FIG. 5 is a partial sectional view illustrating a third embodiment of this invention.

FIG. 5 illustrates another, somewhat structurally different embodiment, which functions in substially the same manner as the embodiments above described. Here there are first and second driving members 310 and 312, the member 310 having a plurality of pivot members 314 connected thereto, each pivot member 314 being received in a slot 316 having defining walls 320 in the driving member 312. The first driving member 310 has a portion 322 which is received in a cavity 324 in the second driving member 312, the cavity being defined in part by a substantially spherical or other curved surface of revolution terminal portion 326 of the second driving member 312, which terminal portion contains substantially the entire extent of the grooves 316. Unlike the pivot members of the other described embodiments, the pivot members 314 are arcuate in longitudinal section; while they may be of various cross-sectional configurations, it is preferable that such cross-sectional configuration be arcuate to permit easy movement relative to their respective slots. The terminus of the end 326 cooperates with the first driving member to limit the angularity which can exist between the members 310 and 312.

Figure 5B:
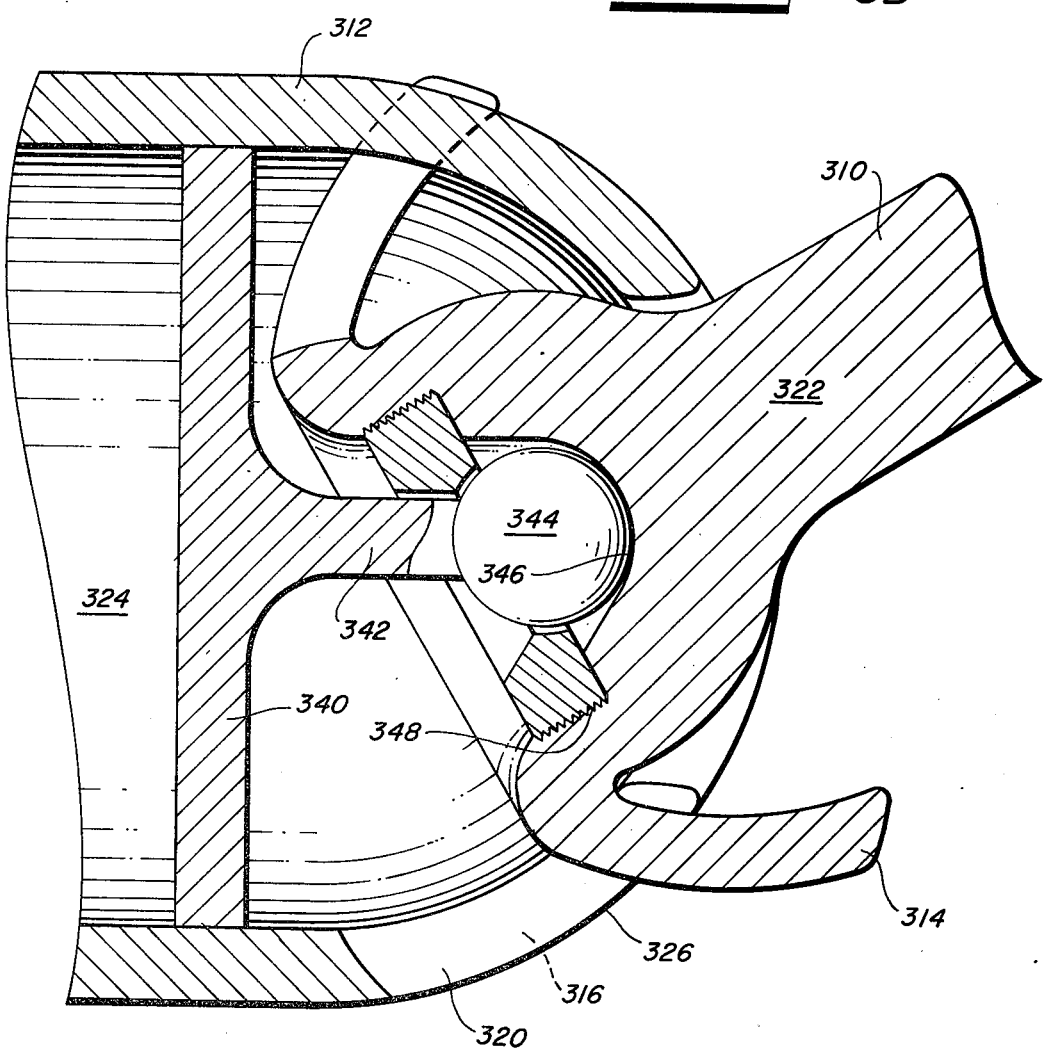

FIGS. 5A and 5B illustrate modifications in the structure described with respect to FIG. 5. In both, means are provided to locate and center the pivot point of the driving member 310 and also to carry thrust loads.

In the embodiment of FIG. 5A, an annular member 328 is connected to the interior of the cavity 324 of the driving member 312; it may be solid or spoked, as desired. A socket 330 extends extends forwardly of the member 328 and is shaped to receive a ball member 332 connected to the drive member 310. The ball member 332 has a threaded portion 334 received in a threaded socket 336 in the member 310. A drive socket 338 in the ball permits the assembly of the parts. The members 328 and 330 may be integrally formed or of assembled, multiple parts.

FIG. 5B illustrates a slightly different arrangement which includes an annular member 340 connected in the cavity 324 having an axially extending center ball locating post 342 with a ball 344 at its terminal end. The ball fits in the socket 346 defined by the end of the portion 322. To retain the ball, a washer 348 is threadably received in the portion 322; the washer is centrally shaped to permit the pivoting movement of the member 310 relative to the post 342.

Figure 6:
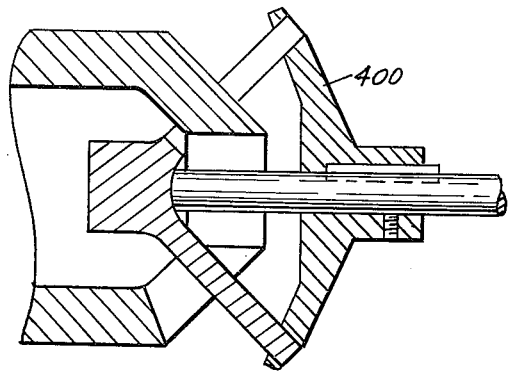
FIG. 6 is a partial sectional view illustrating the use of an additional support for pivot members, especially adaptable for the FIGS. 1 to 4 embodiments.

Additional high torque capacity can be achieved by using a coupling arrangement as illustrated in FIG. 6. This arrangement is especially adaptable for the embodiments of FIG. 1 to 4 but may be used for all embodiments with some modification in shape but not principle. It comprises a disc or support member 400 keyed to or integral with the first driving member 10 (or 110 or 210, as the case may be) which has openings to receive the ends of the pivot members 14 (or 114 or 214, as the case may be) otherwise connected to the pivot members. The disc, which is positively positioned on the member 10 as by a set screw, or other positive connecting means, or made integral with the member 10, eliminates the cantilever support for the pivot members, such that they are supported at both ends and takes much of the torque load off the narrow position of the shaft.

In each of the embodiments described and illustrated, the pivot members, i.e., 14, 114, 214 or 314, as the case may be, may be constructed of tubular material which provides the necessary strength but not the weight associated with solid sectioned members; also, any cylindrical members with cavities therein can be made as an integral part of a tubular drive shaft.

As will be readily understood, the number of pivot members and thus the number of slots in one of the driving elements and, also the particular spacing of such pivot members and slots may vary. High strength and low cost favors fewer pivot members but smoother action and lower weight in large joints favors higher numbers of these parts. This aspect is in at least partly governed by the elasticity of elements and manufacturing tolerances which could cause deviations from exact geometry which would, in turn introduce slight torsional vibrations in the joint. For example, a joint with six elements could resonate twice, three times or six times per revolution while a joint with five elements can only resonate five times per revolution. Resonance in some cases could overload the joint and make a joint drive rough. Higher frequences are more easily absorbed in typical machine elements; strength of elements increases faster than size, so high torque, compact units should use fewer pivot members.

I claim:

1. A universal joint for the transmission of rotational movements between two shafts; comprising:
   a first driving member rigidly associated with one of said two shafts;
   a pivot means rigidly fixed to said first driving member;
   said pivot means extending obliquely to said first driving member and generally extending in a direction to overlie said first driving member;
   a second driving member rigidly associated with the other of said two shafts;
   said second driving member having a cavity and grove means intersecting the cavity, said grove means corresponding in number and spacing to said pivot means, each grove means receiving a pivot means and said cavity receiving a part of said first driving member whereby said first driving member pivots about a point located in said cavity on the logitudinal axis of said second driving member and said pivot means move relative to said second driving member and in their respective grooves when the logitudinal axes of said driving member are angularly arranged with respect to one another.

2. A universal joint for the transmission of rotational movements between two shafts; comprising:
   a first driving member rigidly associated with one of said two shafts;
   a plurality of generally equally spaced pivot means rigidly fixed to said first driving member;
   each said pivot means extending obliquely to said first driving member and generally extending in a direction to overlie said first driving member;
   a second driving member rigidly associated with the other of said two shafts;
   said second driving member having a cavity and a plurality of grooves intersecting the cavity, said grooves corresponding in number and spacing to said pivot means, each of said grooves receiving a pivot means and said cavity receiving a part of said first driving member whereby said first driving member pivots about a point located in said cavity on the logitudinal axis of said second driving member and said pivot means move relative to said second driving member and in their respective grooves when the longitudinal axes of said driving members are angularly arranged with respect to one another.

3. A universal joint as recited in claim 2, further comprising a support member rigidly associated with said pivot means and said other of said two shafts.

4. A universal joint as recited in claim 2, further comprising means to locate the pivot of said pivot means and to carry axial loads.

5. A universal joint as recited in claim 4, in which said locating means comprises a disc having a concave spherical surface to accommodate the terminal end of said first driving member.

6. A universal joint as recited in claim 4, in which said locating means comprises a ball received in a socket.

7. A universal joint as recited in claim 6, in which said socket is part of said first driving member.

8. A universal joint as recited in claim 6, in which said locating means comprises a member received in said second driving member and said socket is part of said locating means member.

9. A universal joint for the transmission of rotational movements between two shafts; comprising:
   a first driving member rigidly associated with one of said two shafts;
   a plurality of generally equally spaced pivot means rigidly fixed to said first driving member;
   each said pivot means extending obliquely to said first driving member and generally extending in a direction to overlie said first driving member;
   a second driving member rigidly associated with the other of said two shafts;
   said second driving member having a cavity and a plurality of grooves intersecting the cavity, said grooves corresponding in number and spacing to said pivot means, each of said grooves receiving a pivot means and said cavity receiving a part of said first driving member whereby said first driving member pivots about a point located in said cavity on the longitudinal axis of said second driving member and said pivot means move relative to said second driving member and in their respective grooves when the longitudinal axes of said driving members are angularly arranged with respect to one another; said second driving member having a terminal portion which converges toward its longitudinal axis and in the direction of said second driving member, said grooves being primarily located in said converging terminal portion.

10. A universal joint as recited in claim 9, wherein said converging portion is substantially conical in shape.

11. A universal joint as recited in claim 9, wherein said converging portion is substantially spherical in shape.

12. A universal joint as recited in claim 9, wherein said grooves are straight and extend generally in the direction of said longitudinal axis of said second driving member.

13. A universal joint as recited in claim 12, wherein said grooves have spaced walls with defining surfaces which are arcuate.

14. A universal joint as recited in claim 13, wherein intermediate, arcuate surfaced members are rotatably and slidably mounted on each pivot members, which intermediate members engage the said walls of a groove for rolling relative movement.

15. A universal joint as recited in claim 10, in which said pivot members are right circular cylindrical in shape.

16. A universal joint as recited in claim 11, in which said pivot members are arcuate in plan view.

17. A universal joint as recited in claim 9, wherein said terminal portion of said second driving member defines an opening for said cavity, which opening determines in part the limit of angular movement of said first driving member relative to the second driving member.

18. A universal joint for the transmission of rotational movements between two shafts; comprising:
   a first driving member rigidly associated with one of said two shafts;
   a plurality of generally equally spaced pivot means rigidly fixed to said first driving member;
   each said pivot means extending obliquely to said first driving member and generally extending in a direction to overlie said first driving member;
   a second driving member rigidly associated with the other of said two shafts;

said second driving member having a conical portion and a cavity, a plurality of grooves intersecting the cavity in said conical portion, said grooves corresponding in number and spacing to said pivot means, each of said grooves receiving a pivot means and said cavity receiving a part of said first driving member whereby said first driving member pivots about a point located in said cavity on the longitudinal axis of said second driving member and said pivot means move relative to said second driving member and in their respective grooves when the longitudinal axes of said driving members are angularly arranged with respect to one another; and a locating member in said cavity having a concave spherical surface, said member locating the pivot point and guiding the terminal end of said first driving member, said locating member carrying axial loads on said joint.

19. A universal joint as recited in claim 18, further comprising a support member rigidly associated with said pivot means and said other of said two shafts.

20. A universal joint for the transmission of rotational movements between two shafts; comprising;

a first driving member rigidly associated with one of said two shafts;

a plurality of generally equally spaced pivot means rigidly fixed to said first driving member;

each said pivot means extending obliquely to said first driving member and generally extending in a direction to overlie said first driving member;

a second driving member rigidly associated with the other of said two shafts;

said second driving member having a spherical converging portion and a cavity and a plurality of grooves intersecting the cavity in said converging portion, said grooves corresponding in number and spacing to said pivot means, each of said grooves receiving a pivot means and said cavity receiving a part of said first driving member whereby said first driving member pivots about a point located in said cavity on the longitudinal axis of said second driving member and said pivot means move relative to said second driving member and in their respective grooves when the longitudinal axes of said driving members are angularly arranged with respect to one another; and means to locate the pivot point of said first driving member in said cavity and to carry axial loads on said joint, said locating member comprising a cooperating ball and socket operatively associated with said first driving member.

21. A universal joint as recited in claim 20, further comprising a support member rigidly associated with said pivot means and said other of said two shafts.

22. A universal joint as recited in claim 20, wherein said locating member comprises a member fixed in said cavity and having a socket and said ball being connected to said first driving member.

23. A universal joint as recited in claim 20, wherein said driving member has a socket and said ball is positioned in said socket by a retainer fixed in said cavity.

* * * * *